(12) United States Patent
Staude et al.

(10) Patent No.: US 10,379,590 B2
(45) Date of Patent: Aug. 13, 2019

(54) ENERGY SUPPLY ASSEMBLY, POINT OF SALE SYSTEM AND POWERED USB HOST ADAPTER

(71) Applicant: Fujitsu Technology Solutions Intellectual Property GmbH, München (DE)

(72) Inventors: Rainer Staude, München (DE); Rudolf Häußermann, München (DE)

(73) Assignee: Fujitsu Technology Solutions Intellectual Property GmbH, München (DE)

( * ) Notice: Subject to any disclaimer, the term of this patent is extended or adjusted under 35 U.S.C. 154(b) by 218 days.

(21) Appl. No.: 15/512,894

(22) PCT Filed: Sep. 14, 2015

(86) PCT No.: PCT/EP2015/070958
§ 371 (c)(1),
(2) Date: Mar. 21, 2017

(87) PCT Pub. No.: WO2016/062459
PCT Pub. Date: Apr. 28, 2016

(65) Prior Publication Data
US 2017/0300097 A1 Oct. 19, 2017

(30) Foreign Application Priority Data

Oct. 20, 2014 (DE) .................. 10 2014 115 235
Mar. 26, 2015 (DE) .................. 10 2015 104 654

(51) Int. Cl.
*G06F 1/26* (2006.01)
*G06F 1/28* (2006.01)
*G06Q 20/20* (2012.01)

(52) U.S. Cl.
CPC ............. *G06F 1/266* (2013.01); *G06F 1/28* (2013.01); *G06Q 20/20* (2013.01)

(58) Field of Classification Search
CPC ............. H02M 1/15; H02M 2001/008; H02M 2003/1586; H02M 1/14; H02M 3/156;
(Continued)

(56) References Cited

U.S. PATENT DOCUMENTS 5,087,871 A  2/1992 Losel
9,882,423 B2 * 1/2018 Olsen .................. H02J 9/062
(Continued)

FOREIGN PATENT DOCUMENTS

EP    2 728 439 A1    5/2014
WO   2008/079528 A2  7/2008

OTHER PUBLICATIONS

Guerrero, J. M. et al., "Uninterruptible Power Supply Systems Provide Protection", *IEEE Industrial Electronics Magazine*, 2007, vol. 1, No. 1, pp. 28-38.
(Continued)

*Primary Examiner* — Zahid Choudhury
(74) *Attorney, Agent, or Firm* — DLA Piper LLP (US)

(57) ABSTRACT

An energy supply assembly includes a supply input that provides a first voltage $V_{IN}$ with a maximum output current; a first voltage converter connected to the supply input to convert the first voltage $V_{IN}$ into a second voltage; an intermediate storage element connected to the first voltage converter to temporarily store electric energy of the second voltage; at least one first supply output connected to the supply input to provide the first voltage $V_{OUT1}$; at least one second supply output connected to the intermediate storage element to provide a further supply voltage $V_{OUT2}$; a measuring device to measure a current received via the supply input and/or a current output via the first supply output; and
(Continued)

a control circuit that actuates the first voltage converter, wherein the control circuit is configured to actuate the first voltage converter on the basis of the measured current such that the current output via the at least one first supply output and the current received by the first voltage converter together do not exceed the maximum output current.

11 Claims, 2 Drawing Sheets

(58) Field of Classification Search
CPC ............. H02M 3/157; H02M 1/584; H02M 2001/007; G01R 29/18; G06F 1/26; G06F 1/28
See application file for complete search history.

(56) References Cited

U.S. PATENT DOCUMENTS

| | | | |
|---|---|---|---|
| 10,108,243 B1 * | 10/2018 | Chen | G06F 1/3212 |
| 10,141,739 B1 * | 11/2018 | Davis | H02J 1/00 |
| 2010/0280676 A1 * | 11/2010 | Pabon | G06F 1/266 |
| | | | 700/295 |
| 2011/0006607 A1 | 1/2011 | Kwon et al. | |
| 2011/0185090 A1 | 7/2011 | Kushnir | |
| 2013/0073758 A1 * | 3/2013 | Chang | G06F 1/266 |
| | | | 710/106 |

OTHER PUBLICATIONS

"Retail USB, USB PlusPower, USB + Power: Electro-Mechanical Specification Version 0.8g", www.PoweredUSB.org, 2005, pp. 1-33.

* cited by examiner

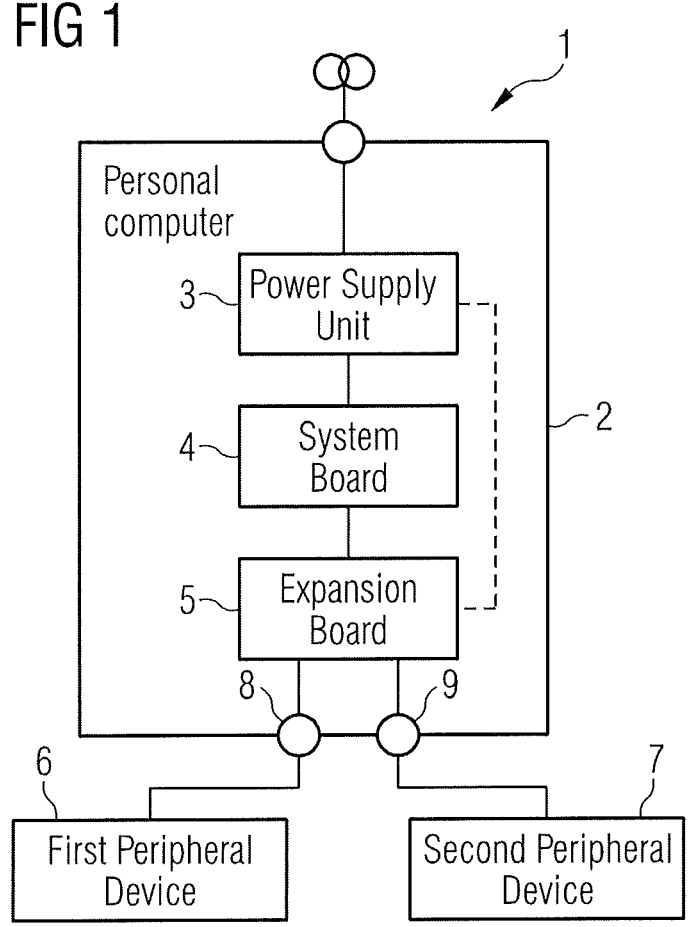
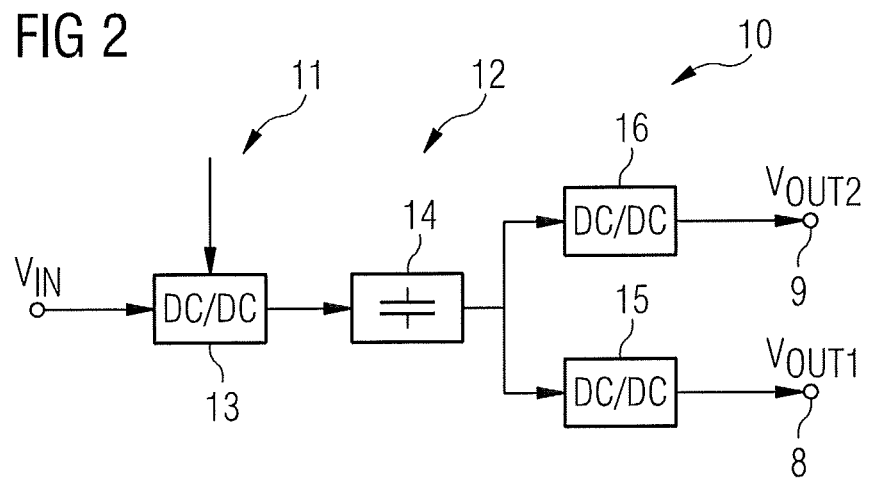

US 10,379,590 B2

ENERGY SUPPLY ASSEMBLY, POINT OF SALE SYSTEM AND POWERED USB HOST ADAPTER

TECHNICAL FIELD

This disclosure relates to an energy supply assembly comprising a supply input that provides a first voltage with a maximum output current, at least one first supply output and at least one second supply output. The disclosure also relates to a point of sale system having such an energy supply assembly and a powered USB host adapter.

BACKGROUND

In combination with personal computers (PCs) for point of sale (POS) applications, special periphery for POS applications is used. That periphery connects to the PC via a specific powered USB cable. When using devices without internal power supply unit or without specific powered USB port, e.g. when using so-called tablet computers, such a periphery is operated via an external powered USB host adapter, if needed. That periphery either has a 12 V or a 24 V supply voltage. The powered USB industrial standard is described in the document "Retail USB, USB PlusPower, USB+Power—Electro-Mechanical Specification, Version 0.8g", for example. Compared to conventional USB ports, powered USB ports comprise additional contacts for power supply of powered USB peripheral devices.

In this context, one problem lies with the fact that the powered USB periphery requires high peak power in operation. The power supply units of conventional PC standard systems, in particular so-called thin clients, are not configured to additionally support the peak power of the powered USB devices. When using external powered USB host adapters, dimensioning for the peak power leads to lower energy efficiency, at least during operation with a much lower power.

SUMMARY

We provide an energy supply assembly including a supply input that provides a first voltage $V_{IN}$ with a maximum output current; a first voltage converter connected to the supply input to convert the first voltage $V_{IN}$ into a second voltage; an intermediate storage element connected to the first voltage converter to temporarily store electric energy of the second voltage; at least one first supply output connected to the supply input to provide the first voltage $V_{OUT1}$; at least one second supply output connected to the intermediate storage element to provide a further supply voltage $V_{OUT2}$; a measuring device to measure a current received via the supply input and/or a current output via the first supply output; and a control circuit that actuates the first voltage converter, wherein the control circuit is configured to actuate the first voltage converter on the basis of the measured current such that the current output via the at least one first supply output and the current received by the first voltage converter together do not exceed the maximum output current.

We also provide a point of sale system including a central data processing unit with a power supply unit; an energy supply assembly including a supply input connected to the power supply unit, wherein the power supply unit provides a first voltage with a maximum output current to the supply input, a first voltage converter connected to the supply input to convert the first voltage into a second voltage, an intermediate storage element connected to the first voltage converter to temporarily store electric energy of the second voltage, at least one first supply output connected to the supply input to provide the first voltage, at least one second supply output connected to the intermediate storage element to provide a further supply voltage, a measuring device to measure a current received via the supply input and/or a current output via the first supply output; and a control circuit to actuate the first voltage converter, wherein the control circuit is configured to actuate the first voltage converter on the basis of the measured current such that the current output via the at least one first supply output and the current received by the first voltage converter together do not exceed the maximum output; and at least one peripheral device coupled to the central data processing unit, wherein the peripheral device connects to either the first supply output or the second supply output of the energy supply assembly and is supplied with electric energy by the central data processing unit.

We further provide a Powered USB host adapter including at least one USB port adapted to connect the powered USB host adapter to a host system; a power supply unit to provide a first voltage $V_{IN}$ with a maximum output current; a first voltage converter connected to the power supply unit to convert the first voltage $V_{IN}$ into a second voltage; an intermediate storage element connected to the first voltage converter to temporarily store electric energy of the second voltage; at least one first supply output connected to the power supply unit to provide the first voltage $V_{OUT1}$; at least one second supply output connected to the intermediate storage element to provide a further supply voltage $V_{OUT2}$; a measuring device to measure a current received via the supply input and/or a current output via the first supply output; and a control circuit to actuate the first voltage converter, wherein the control circuit is configured to actuate the first voltage converter on the basis of the measured current such that the current output via the at least one first supply output and the current received by the first voltage converter together do not exceed the maximum output current.

BRIEF DESCRIPTION OF THE DRAWINGS

FIG. 1 shows a schematic illustration of a first point of sale system.

FIG. 2 shows a schematic illustration of a first possible approach to solving a problem.

LIST OF REFERENCE NUMERALS

Figure 3:
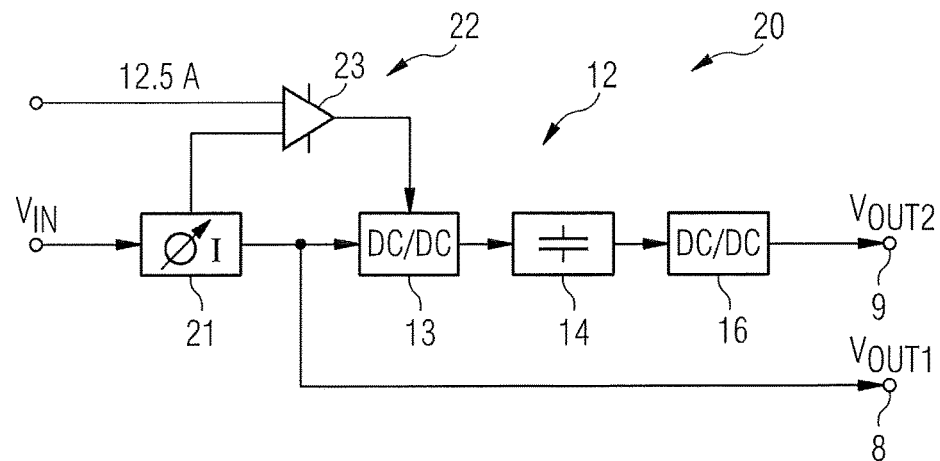
FIG. 3 shows a schematic illustration of a second approach.

1 Point of sale system
2 Personal computer
3 Power supply unit
4 System board
5 Expansion board
6 first peripheral device
7 second peripheral device
8 first supply output
9 second supply output
10 first powered USB expansion board
11 circuit for limiting the input power
12 energy storage
13 boost converter 14 capacitor bank
15 first buck converter
16 second buck converter
20 second powered USB expansion board
21 circuit for measuring the input voltage
22 circuit for reducing the current limit
23 control
30 point of sale system
31 tablet computer
32 USB port (of the tablet computer)
33 supply input (of the tablet computer)
34 external power supply (of the tablet computer)
35 powered USB host adapter
36 USB port (of the powered USB host adapter)
37 USB cable
38 first supply output
39 second supply output
40 power supply unit (of the powered USB host adapter)
41 energy supply circuit
$V_{IN}$ input voltage
$V_{OUT1}$ first supply voltage
$V_{OUT2}$ second supply voltage

DETAILED DESCRIPTION

We provide an energy supply assembly. The energy supply assembly comprises a supply input that provides a first voltage with a maximum output current, a first voltage converter connected to the supply input to convert the first voltage into a second voltage, and an intermediate storage element connected to the first voltage converter to temporarily store electric energy of the second voltage. Furthermore, the energy supply assembly comprises at least one first supply output connected to the supply input to provide the first voltage, at least one second supply output connected to the intermediate storage element to provide another supply voltage, as well as a measuring device to measure a current received via the supply input and/or a current output via the first supply output. Furthermore, the energy supply assembly comprises a control circuit to actuate the first voltage converter, wherein the control circuit is configured to actuate the first voltage converter on the basis of the measured current such that the current output via the at least one first supply output and the current received via the first voltage converter taken together do not exceed the maximum output current.

Inter alia, such an assembly serves to temporarily store at least part of the power received via a supply input in an intermediate storage element. A first supply output can be directly supplied by the supply input. At the same time, a further supply voltage from the energy temporarily stored in the intermediate storage element can be provided to a second supply output without power peaks of a consumer connected there directly affecting the supply input. In this case, both the current output directly to the first supply output and the current indirectly output to the second supply output via the intermediate storage element are taken into account for the energy reception at the supply input so that an overload of the supply input is prevented.

The measuring device may be configured to measure a current received via the supply input and the control circuit may comprise a comparator configured to compare the current received by the measuring device to the maximum output current and actuate the first voltage converter on the basis of the comparison. Such a configuration enables a particularly simple implementation of the control circuit by analogous and/or discrete circuit components.

The energy supply assembly may also comprise a second voltage converter arranged between the intermediate storage element and the at least one second supply output to convert the second voltage into the further supply voltage. Voltage drops at the intermediate storage element on the side of the second supply output can be compensated by interposing a second voltage converter between the intermediate storage element and the at least one second supply output so that a voltage drop will not occur there in case of peak loads.

We also provide a point of sale system. The point of sale system comprises a central data processing unit having a power supply unit, at least one peripheral device coupled to the central data processing unit, wherein the peripheral device is supplied with electric energy by the central data processing unit, and an energy supply connected between the power supply unit of the central data processing unit and the at least one peripheral device. The power supply unit connects to the supply input and the at least one peripheral device connects either to the first or to the second supply output of the energy supply assembly.

Such a point of sale system allows customary peripheral devices for so-called POS applications in conjunction with conventional PC standard systems, in particular so-called thin clients, that are equipped with a power supply unit relatively low in performance.

We further provide a powered USB host adapter. Such a powered USB host adapter is particularly suitable for operating peripheral devices with a high peak power at a power supply unit with a maximum output power below said peak power. For example, it allows operating powered USB peripheral devices with a tablet computer using a relatively small power supply unit.

Further advantages are disclosed in the following description of examples as well as the appended claims.

Our assemblies, systems and adapters will hereinafter be explained in greater detail by examples with respect to the appended figures.

FIG. 1 shows a first point of sale system 1. The point of sale system 1 comprises a personal computer 2 in the form of a so-called thin client, which forms a central data processing unit for the point of sale system 1. In the example, the personal computer 2 comprises an installed power supply unit 3, a system board 4 as well as an expansion board 5 to be described later in greater detail. Inter alia, a processor as well as further system components of the personal computer 2 are arranged on the system board 4.

In the example illustrated in FIG. 1, the system board 4 simultaneously distributes the supply voltage output by the power supply unit 3. Inter alia, the supply voltage output by the power supply unit 3 to the system board 4 is also provided to the expansion board 5. Alternatively (not illustrated), the expansion board 5 directly connects to the power supply unit 3. This way, especially high-performing peripheral devices can be supplied by the power supply unit 3 while bypassing the system board 4. The power supply unit 3 may also be an external power supply unit connected to the personal computer 2 via a supply line.

Furthermore, the point of sale system 1 comprises two peripheral devices 6 and 7. The first peripheral device 6, e.g. a payment terminal that reads magnetic cards and chip cards, connects to the expansion board 5 via a first supply output 8. For example, a supply voltage of 12 V is provided via the first supply output 8. The second peripheral device 7, e.g. a printer of the point of sale system 1, is connected to the expansion board 5 via a second supply output 9. In the example, a supply voltage of 24 V is provided via the second supply output 9.

A first powered USB expansion board 10 has been developed for retrofitting the support for these POS peripheral devices 6 and 7. To solve the above-mentioned problem, a circuit 11 to limit the input power as well as an energy storage 12 were integrated on the first powered USB expansion board 10 according to FIG. 2, the storage providing the required peak power for the powered USB devices. As a result, safe operation is enabled without overloading the power supply units 3 of conventional systems.

The first approach provides increasing the input voltage $V_{IN}$ from 12 V to 60 V by a boost converter 13. The boost converter 13 operates in a constant current mode and limits the input voltage in case of an overload. In the illustrated example, the power of the boost converter 13 is limited to a fixed value of 150 W plus possible tolerances. In an overload, the 60 V voltage can drop to 30 V corresponding to the load at the output of the converter 13. Capacitors of a capacitor bank 14 on the 60 V voltage are discharged in an overload and thus deliver the energy required to bridge the peak power. Then, the 12 V and the 24 V supply voltage $V_{OUT1}$ and $V_{OUT2}$ are generated from the 16 V voltage for the powered USB devices 6 and 7 by two downstream buck converters 15 and 16.

In this concept, it is required to first boost the entire power to 60 V and then lower it again. As a result, high power loss is produced on the powered USB expansion board 10.

In the second approach according to FIG. 3, this concept is roughly maintained. Thus, reference is made to the above description for circuit components that have already been described with reference to FIG. 2. However, in the expansion board 20 according to FIG. 3, the input voltage $V_{IN}$ from the power supply unit 3 is directly used for the 12 V voltage $V_{OUT1}$ for the 12 V consumers. Thus, the 12 V converter 15 and the losses needed to first boost the energy required by the 12 V consumers 6 to 60 V and then buck it again to 12 V are omitted. Moreover, the boost converter 13 can be configured to be smaller and more cost-efficient. As a result, the powered USB expansion board 20 has a better energy efficiency and becomes cheaper.

To better ensure in the second approach that the input current is limited and the peak power for the connected powered USB devices 6 and 7 is provided, the following new circuit components are required:
- a circuit 21 for measuring the input current (illustrated) or the output current (not illustrated) which is output to the 12 V consumer 7.
- a circuit 22 to reduce the current limit of the 60 V boost converter 13 depending on the input power.

Another requirement is that the peak power of the 12V consumers 6 must not exceed the maximum input power of the powered USB expansion board 20. This requirement is fulfilled in the specific case.

Depending on the input current, the power limit of the boost converter 13 is adjusted dynamically, so that the input power is within the maximum input power of the powered USB expansion board 20 any time. In the illustrated example, a maximum input current of the boost converter 13 is adjusted by a control 23, e.g. a PI control such that the current measured at the circuit 21 does not exceed a maximum value of 12.5 A (corresponding to 150 W power with an input voltage of 12 V).

The capacity of the capacitor bank 14 on the 60 V voltage has the same size as in the first approach according to FIG. 2. Thus, the same amount of energy for over-bridging peaks as in the first approach can be provided.

The described circuit according to FIG. 3 allows combining the advantage of a direct supply of peripheral devices 6 with a first supply voltage of in particular 12 V and the buffered supply of further peripheral devices 7 with a further supply voltage, in particular a supply voltage of 24 V, in a simple manner. The influence of the first supply voltage to the entire input power may be taken into account so that power peaks generated by the peripheral devices 6 and 7 do not lead to an overload situation at the supply input of the expansion board 20.

The solution concepts described with reference to FIGS. 2 and 3 are also suitable for use in other system topologies, e.g. including a host system without integrated power supply unit or without integrated powered USB supply output.

Figure 4:
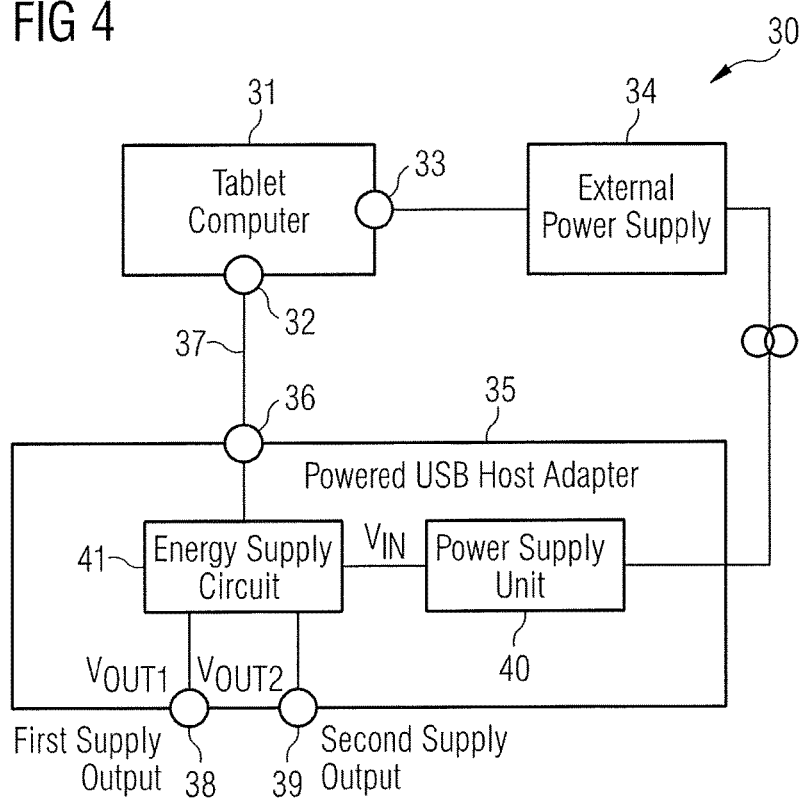
FIG. 4 shows a schematic illustration of a second point of sale system.

FIG. 4 shows a second point of sale system 30. The point of sale system 30 includes a tablet computer 31 on which a so-called POS application of the point of sale system 30 is operated. In the example, the tablet computer 31 comprises a USB port 32 and a supply input 33. The USB port 32 is a conventional USB port according to one of the USB standards 1.0, 1.1, 2.0, 3.0, 3.1 or higher without additional contacts for power supply of powered USB peripheral devices. In the example, the tablet computer 31 is supplied with an operating voltage via an external power supply unit 34, e.g. a power supply plug, connected to the supply input 33. Alternatively or additionally, the tablet computer 31 can also be supplied with an operating voltage from an integrated, re-chargeable battery (not illustrated) or the USB port 32. The power of the power supply unit 34 or the capacity of the battery are not sufficient, however, to supply powered USB peripheral devices with an operating energy.

Accordingly, the point of sale system 30 comprises an external powered USB host adapter 35 connected to the tablet computer 31 via another USB port 36 or a conventional USB cable 37. The tablet computer 31 and the powered USB host adapter 35 connected thereto together form a central data processing unit of the point of sale system 30.

The powered USB host adapter 35 further comprises two supply outputs 38 and 39, which may supply powered USB peripheral devices and are not illustrated in FIG. 4, with a supply voltage of 12 V or 24 V. To provide the power required to that end, the powered USB host adapter 35 includes a distinct power supply unit 40. In the illustrated example, the power supply unit 40 is part of the powered USB host adapter 35. Of course, it may also be an external power supply unit. If required, an external power supply unit can be used, which supply both the tablet computer 51 and the powered USB host adapter 35 with an operating voltage. For example, the tablet computer 31 can be supplied with an operating energy via the USB ports 36 and 32 and the USB cable 37.

Furthermore, an energy supply circuit 41 is arranged on a circuit board of the powered USB host adapter 35, which circuit connects the host-side USB port 36, the periphery-side supply outputs 38 and 39 and the power supply unit 40 to one another. The structure of the energy supply circuit 41 may essentially correspond to the second powered USB expansion board 20 illustrated with reference to FIG. 3. However, in the energy supply circuit 41, the provided input voltage $V_{IN}$ of 12 V is not provided by the tablet computer 31 or via USB port 36, respectively, but via the power supply unit 40 of the powered USB host adapter 35. At the same time, a USB data connection is established between the USB port 36 and the corresponding contacts of the supply outputs 38 and 39. Reference is made to the above explanations of FIG. 3 with respect to the functionality of the energy supply circuit 41.

The point of sale system 30 and the powered USB host adapter 35 contained therein have a lower energy consumption compared to a full-fledged personal computer. Moreover, energy efficiency is improved in that the power supply unit 40 of the powered USB host adapter 35 can be dimensioned for a lower output power due to the energy supply circuit 41 than is available as a peak power on the side of the supply outputs 38 and 39. For example, a power supply unit 40 with an output power of 150 W can be used to supply a printer or a similar powered USB peripheral device having a peak power of up to 300 W and an average energy consumption of 60 to 150 W.

The invention claimed is:

1. An energy supply assembly comprising:
a supply input that provides a first voltage as input voltage $V_{IN}$ with a maximum output current;
a first voltage converter configured as a boost converter and connected to the supply input to convert the first voltage $V_{IN}$ into a second voltage;
an intermediate storage element configured as a capacitor bank and connected to an output of the first voltage converter to temporarily store electric energy of the second voltage;
at least one first supply output connected to the supply input to directly provide the first voltage as a first supply voltage $V_{OUT1}$;
a second voltage converter configured as a buck converter and connected to the intermediate storage element to convert the second voltage into a second supply voltage $V_{OUT2}$;
at least one second supply output connected to an output of the second voltage converter to provide the second supply voltage $V_{OUT2}$;
a measuring device to measure a current received via the supply input and/or a current output via the first supply output; and
a control circuit that actuates the first voltage converter, wherein the control circuit is configured to actuate the first voltage converter on the basis of the measured current such that the current output via the at least one first supply output and the current received by the first voltage converter together do not exceed the maximum output current.

2. The energy supply assembly according to claim 1, wherein the measuring device is configured to measure a current received via the supply input and the control circuit comprises a comparator configured to compare the current measured by the measuring device to the maximum output current and actuate the voltage converter on the basis of the comparison.

3. The energy supply assembly according to claim 1, wherein the second voltage is at least twice as high as the first voltage $V_{IN}$.

4. The energy supply assembly according to claim 1, wherein the second voltage is at least twice as high as the second supply voltage $V_{OUT2}$.

5. A point of sale system comprising:
a central data processing unit with a power supply unit;
an energy supply assembly comprising a supply input connected to the power supply unit, wherein the power supply unit provides a first voltage as input voltage $V_{IN}$ with a maximum output current to the supply input, a first voltage converter configured as a boost converter and connected to the supply input to convert the first voltage into a second voltage, an intermediate storage element configured as a capacitor bank and connected to an output of the first voltage converter to temporarily store electric energy of the second voltage, at least one first supply output connected to the supply input to directly provide the first voltage as a first supply voltage $V_{OUT1}$, a second voltage converter configured as a buck converter and connected to the intermediate storage element to convert the second voltage into a second supply voltage $V_{OUT2}$, at least one second supply output connected to an output of the second voltage converter to provide the second supply voltage $V_{OUT2}$, a measuring device to measure a current received via the supply input and/or a current output via the first supply output; and a control circuit to actuate the first voltage converter, wherein the control circuit is configured to actuate the first voltage converter on the basis of the measured current such that the current output via the at least one first supply output and the current received by the first voltage converter together do not exceed the maximum output; and
at least one peripheral device coupled to the central data processing unit, wherein the peripheral device connects to either the first supply output or the second supply output of the energy supply assembly and is supplied with electric energy by the central data processing unit.

6. The point of sale system according to claim 5, wherein the central data processing unit is configured as a personal computer or as a so-called thin client with an internal power supply unit that supplies the at least one peripheral device with electric energy via a standard interface or a powered USB interface.

7. The point of sale system according to claim 5, wherein the central data processing unit comprises a tablet computer and at least one energy supply circuit connected to the tablet computer and the power supply unit, and the tablet computer and the energy supply circuit connect to one another via a standard interface or a conventional USB interface.

8. The point of sale system according to claim 5, wherein the measuring device is configured to measure a current received via the supply input and the control circuit comprises a comparator configured to compare the current measured by the measuring device to the maximum output current and actuate the voltage converter on the basis of the comparison.

9. The point of sale system according to claim 5, wherein the second voltage is at least twice as high as the first voltage.

10. The point of sale system according to claim 5, wherein the second voltage is at least twice as high as the further supply voltage.

11. A Powered USB host adapter comprising:
at least one USB port adapted to connect the powered USB host adapter to a host system;
a power supply unit to provide a first voltage as input voltage $V_{IN}$ with a maximum output current;
a first voltage converter configured as a boost converter and connected to the power supply unit to convert the first voltage into a second voltage;
an intermediate storage element configured as a capacitor bank and connected to an output of the first voltage converter to temporarily store electric energy of the second voltage;
at least one first supply output connected to the power supply unit to directly provide the first voltage as a first supply voltage $V_{OUT1}$;
a second voltage converter configured as a buck converter and connected to the intermediate storage element to convert the second voltage into a second supply voltage $V_{OUT2}$;

at least one second supply output connected to an output of the second voltage converter to provide the second supply voltage $V_{OUT2}$;

a measuring device to measure a current received via the supply input and/or a current output via the first supply output; and a control circuit to actuate the first voltage converter, wherein the control circuit is configured to actuate the first voltage converter on the basis of the measured current such that the current output via the at least one first supply output and the current received by the first voltage converter together do not exceed the maximum output current.

* * * * *